(12) United States Patent
Senay

(10) Patent No.: US 7,219,307 B2
(45) Date of Patent: May 15, 2007

(54) METHODS FOR GRAPHICALLY REPRESENTING INTERACTIONS AMONG ENTITIES

(75) Inventor: Hikmet Senay, Ossining, NY (US)

(73) Assignee: JPMorgan Chase Bank, New York, NY (US)

( * ) Notice: Subject to any disclaimer, the term of this patent is extended or adjusted under 35 U.S.C. 154(b) by 530 days.

(21) Appl. No.: 09/851,867

(22) Filed: May 9, 2001

(65) Prior Publication Data

US 2002/0038218 A1    Mar. 28, 2002

Related U.S. Application Data

(63) Continuation of application No. 09/726,884, filed on Nov. 30, 2000.

(60) Provisional application No. 60/234,503, filed on Sep. 22, 2000.

(51) Int. Cl.
*G06F 3/00*    (2006.01)

(52) U.S. Cl. .................. 715/764; 715/645; 715/734; 715/853; 715/746; 455/435.5; 709/370

(58) Field of Classification Search ................ 345/645, 345/734–737, 853–854; 709/370; 455/435.5; 715/764, 761, 746, 762
See application file for complete search history.

(56) References Cited

U.S. PATENT DOCUMENTS

| | | | | |
|---|---|---|---|---|
| 5,276,789 | A | * | 1/1994 | Besaw et al. ............... 345/440 |
| 5,745,113 | A | * | 4/1998 | Jordan et al. ............... 715/835 |
| 5,768,552 | A | * | 6/1998 | Jacoby ........................ 345/441 |
| 5,774,878 | A | | 6/1998 | Marshall |
| 5,821,937 | A | | 10/1998 | Tonelli et al. |
| 5,835,085 | A | * | 11/1998 | Eick et al. ................... 715/853 |
| 5,845,277 | A | * | 12/1998 | Pfeil et al. ...................... 707/3 |
| 5,875,446 | A | * | 2/1999 | Brown et al. ................... 707/3 |
| 5,909,217 | A | * | 6/1999 | Bereiter ........................ 345/854 |
| 5,964,839 | A | * | 10/1999 | Johnson et al. .............. 709/224 |
| 6,014,647 | A | * | 1/2000 | Nizzari et al. ................. 705/39 |

(Continued)

FOREIGN PATENT DOCUMENTS

JP    02001273180 A    10/2001

OTHER PUBLICATIONS

Donath, Judith, "Visualizing Conversation" Jan. 1999, Proceedings of the Hawaii International Conference on System Sciences 32, pp. 1-11.*

(Continued)

*Primary Examiner*—Kristine Kincaid
*Assistant Examiner*—Ryan Pitaro
(74) *Attorney, Agent, or Firm*—Hunton & Williams LLP

(57) ABSTRACT

Methods for graphically representing interactions among entities within an organization are provided. These methods, in their basic form, include providing graphical objects corresponding to the entities, varying graphical properties of the graphical objects to correspond to preselected attributes of the entities, and displaying on a display screen the graphical objects and interactions between the entities represented by the graphical objects. The specific graphical methods described and claimed include interactions between units within an organization, interactions between members within a unit of an organization, interactions between a member and other members within an organization, interactions between hypothetical units within an organization, and interactions between members of units within an organization. As used herein, "organization" denotes any grouping of individuals or units of individuals, including communities and companies.

15 Claims, 18 Drawing Sheets

U.S. PATENT DOCUMENTS

| | | | |
|---|---|---|---|
| 6,029,195 A * | 2/2000 | Herz | 725/116 |
| 6,044,374 A | 3/2000 | Nesamoney et al. | |
| 6,062,862 A | 5/2000 | Koskinen | |
| 6,067,548 A * | 5/2000 | Cheng | 707/103 R |
| 6,073,115 A | 6/2000 | Marshall | |
| 6,078,924 A | 6/2000 | Ainsbury et al. | |
| 6,133,914 A * | 10/2000 | Rogers et al. | 345/661 |
| 6,286,017 B1 | 9/2001 | Egilsson | |
| 6,476,830 B1 * | 11/2002 | Farmer et al. | 715/769 |
| 6,496,842 B1 * | 12/2002 | Lyness | 715/514 |
| 6,509,898 B2 * | 1/2003 | Chi et al. | 345/440 |
| 2002/0038218 A1 | 3/2002 | Senay et al. | |

OTHER PUBLICATIONS

Erickson, Thomas. et al , "Socially Translucent Systems: Social Proxies, Persistent Conversation, and the Design of "Babble"", CHI 99, pp. 1-14.*

Smith, Marc.et al, "Conversation Trees and Threaded Chats" Jun. 20, 2000, pp. 1-11.*

Girardin, Luc. et al , "A Visual Approach for Monitoring Logs", Dec. 6-11, 1998, pp. 299-308.*

PCT Written Opinion, Feb. 5, 2003.

* cited by examiner

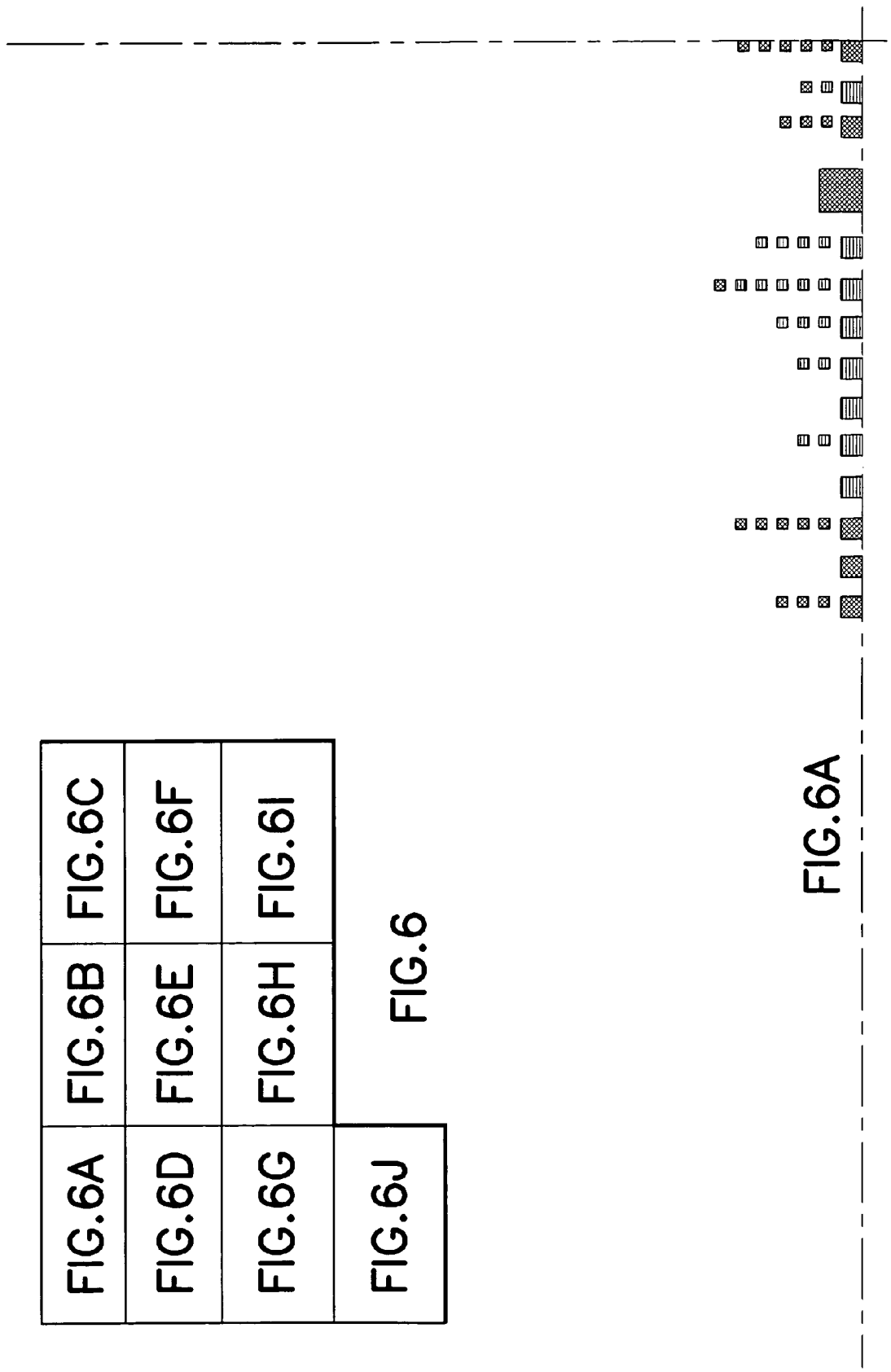

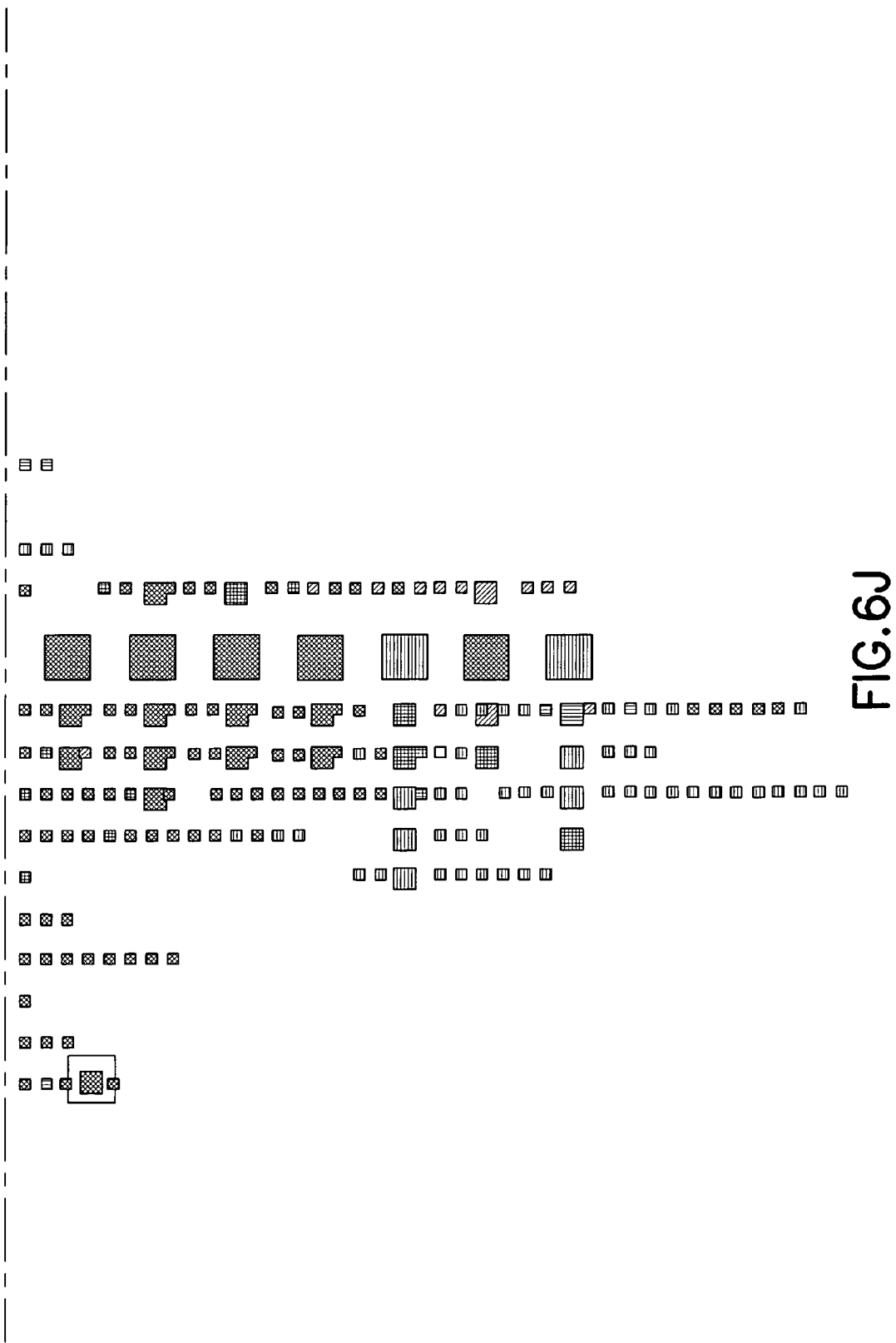

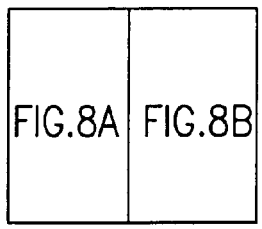
FIG.8
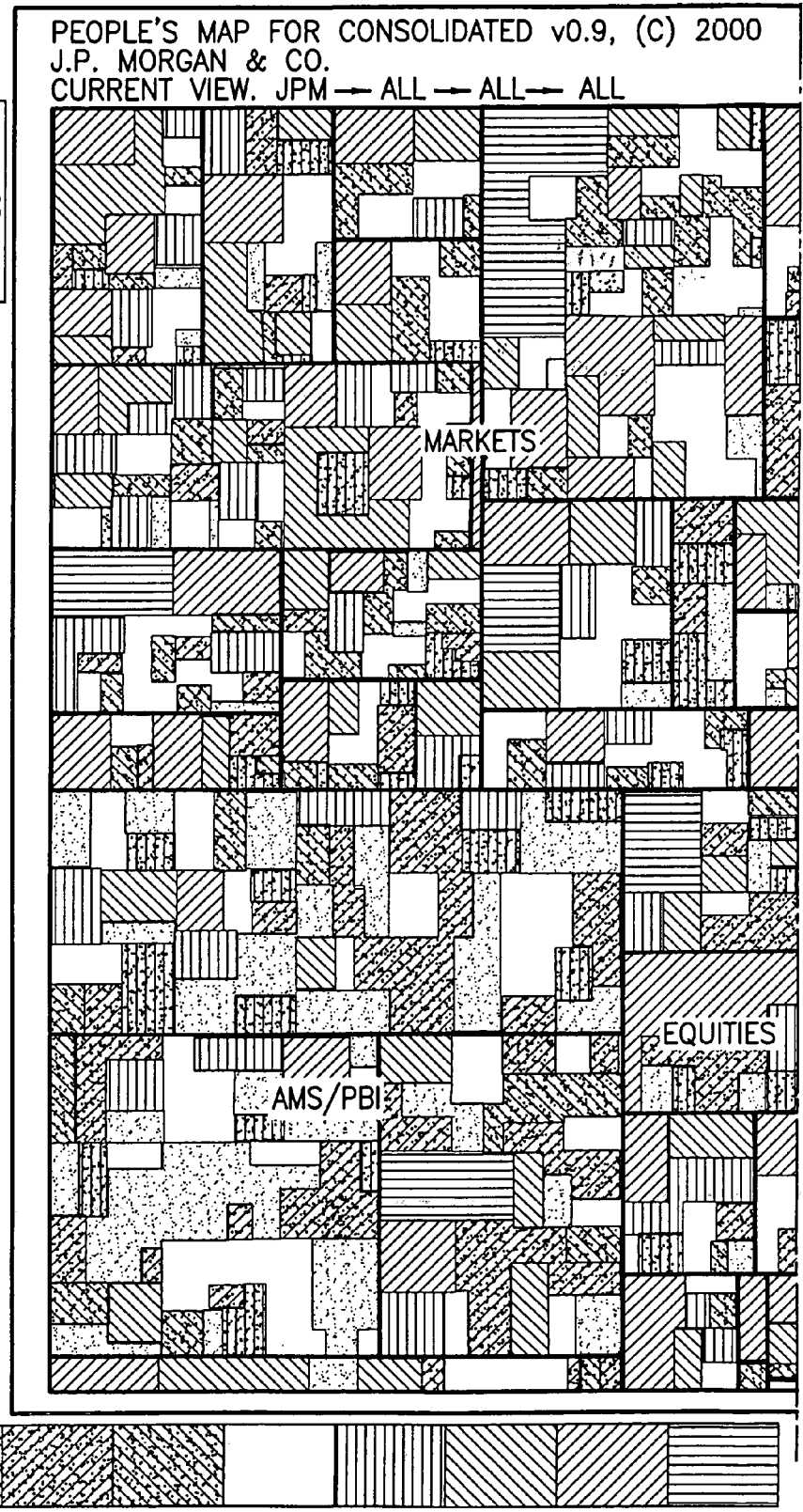
FIG.8A
DISPLAY RANGE
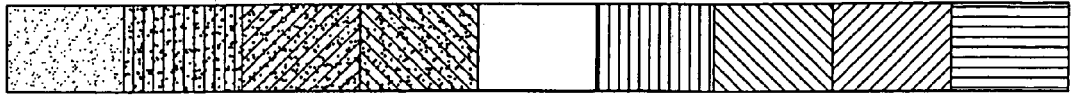
LOW　　　　　　　　　　　　　　　　　　　　HIGH

METHODS FOR GRAPHICALLY REPRESENTING INTERACTIONS AMONG ENTITIES

RELATED U.S. APPLICATION

This is a continuation of pending U.S. application Ser. No. 09/726,884 filed Nov. 30, 2000, which is incorporated by reference herein. This application also claims priority from U.S. Provisional Application Ser. No. 60/234,503 filed on Sep. 22, 2000, which is incorporated by reference herein.

BACKGROUND OF THE INVENTION

One of the most valuable assets of a company, if not the most critical one, is its intellectual capital which, among other things, includes human assets. A company can maximize its intellectual capital only if it understands its key elements and how these elements interact with each other to add value to the company. Understanding the nature of the interactions between these elements can reveal significant information about and for the company. More and more companies today acknowledge the importance and relevance of such interactions, and allocate significant resources to analyze and utilize these interactions. Successful companies manage to extend these interactions well beyond the company boundaries by analyzing interactions with customers, partners, suppliers and alliances as well. Essentially, such interactions, whether explicit or implicit, define specialized human networks with complex organizational dynamics.

While the importance of human networks is well understood for effective organizational management, existing methodologies by which such networks can be analyzed are not well-defined. Existing methodologies generally rely on statistical sampling and/or informal opinion polling techniques which are neither complete nor reliable. Typically, they are ad hoc and do not include the entire target population in analyses. Also, existing methodologies focus on qualitative rather than quantitative analyses of organizational interactions.

Furthermore, at present, the only way to display interactions among entities that is known to the inventor is the brute-force documentation of interactions in either a spreadsheet or a directed graph structure. "Entity" as used herein includes individuals as well as groups, such as a department within a corporation. Directed graphs function by explicitly linking entities and while typically easier to understand and glean information from than spreadsheets, are not satisfactory as the number of entities and the number of interactions increase.

What is desired, therefore, is a graphical approach that overcomes the disadvantages of the existing graphical approaches and provides a compact, multi-level interaction context from which desired information can be gleaned expeditiously.

SUMMARY OF THE INVENTION

The purposes of the invention described above and other objects are achieved by methods for graphically representing interactions among entities within an organization. These methods, in their basic form, include providing graphical objects corresponding to the entities, varying graphical properties of the graphical objects to correspond to preselected attributes of the entities, and displaying on a display screen the graphical objects and interactions between the entities represented by the graphical objects.

The specific graphical methods described and claimed include interactions between units within an organization, interactions between members within a unit of an organization, interactions between a member and other members within an organization, interactions between hypothetical units within an organization, and interactions between members of units within an organization. As used herein, "organization" denotes any grouping of individuals or units of individuals, including communities and companies.

DETAILED DESCRIPTION OF THE PREFERRED EMBODIMENT

Figure 1:
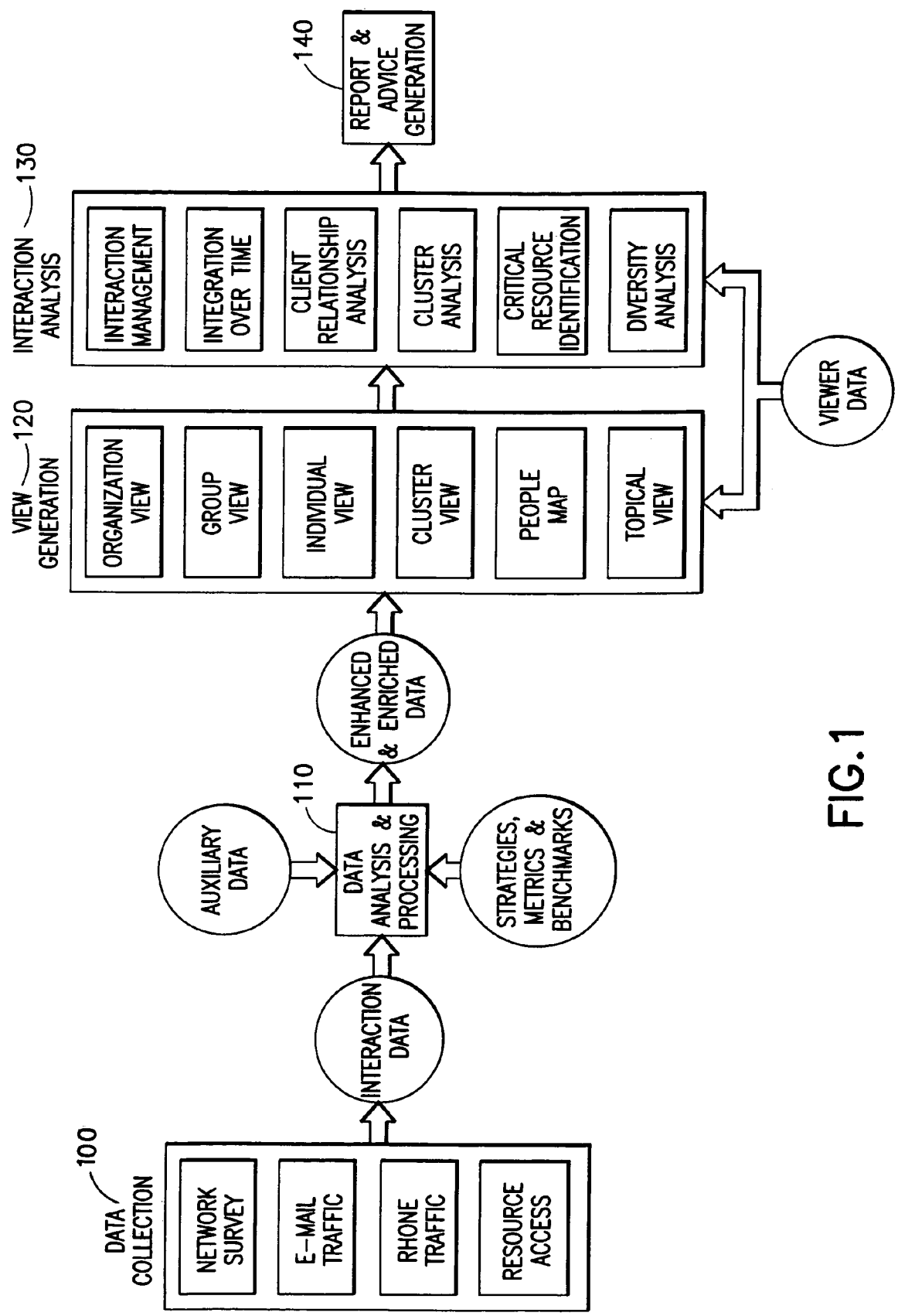
FIG. 1 shows a flow diagram illustrating the preferred embodiment of the interactive visual analysis methodology of the present invention.

FIG. 1 is a flow diagram illustrating the preferred embodiment of the interactive visual analysis methodology of the present invention. This methodology structure includes data collection, generally indicated by reference numeral 100, data analysis and processing, generally indicated by reference numeral 110, view generation, generally indicated by reference numeral 120, and interaction analysis, generally indicated by reference numeral 130.

Data collection 100 includes accumulating interaction data by employing appropriate data collection mechanisms. For example, sources of interaction data include, but are not limited to: (1) Network surveys which poll an entire target population, including people within or outside an organization; (2) E-mail traffic with or without content-based classification; (3) Phone traffic; and (4) Access to shared resources, including but not limited to, files, documents, programs and systems.

Database analysis and processing 110 includes processing the collected interaction data with auxiliary data, such as employee, client, product and/or content data. This step may also include applying statistical, heuristic or clustering techniques—using appropriate measures, strategies and benchmarks—to the processed data, and deriving additional data to enhance and enrich the processed data. There are two important concepts here: connectivity and diversity measures.

Connectivity is a measure for assessing how well entities are connected to their environment. "Entity", as used herein, includes individuals as well as groups, such as a department within an organization. Generally, the connectivity measure is a recursive measure that uses an appropriate decay factor for accounting the effects of indirect connections (or interactions) up to a certain level of depth. Connectivity may be measured in different ways. The following general formulation may be used as a basis for connectivity analysis:

$$C(E,L) = \Sigma_{1 \leq k \leq N}[w(k) + C(k,L-1)/f_d]C(E,0) = 0$$

In this formula, C(E,L) denotes connectivity of entity E at depth L where E has N direct connections (interactions), w(k) is the weight of direct connections from k, and $f_d$ is the decay factor. While several alternatives exist for decaying the effects of indirect connections, typically either a distance-based measure or a degree-based measure is used as a decay factor.

Diversity is a measure for assessing how diverse entities are in their interactions with or connections to their environment. As with the connectivity measure, the diversity measure is also a recursive measure that uses an appropriate decay factor for accounting the effects of indirect interactions (connections) up to a certain level of depth. Depending on analysis needs, diversity may be measured along dimensions, such as age, gender and business types. Diversity may be measured in different ways. The following general formulation may be used as a basis for diversity analysis:

$$D(E,L) = \Sigma_{1 \leq k \leq N}[v(k,p) + D(k,L-1)/f_d]$$

$$D(E,0) = 0$$

In this formula, D(E,L) denotes diversity of entity E at depth L where E has N direct connections (interactions), and v(k,p)=0 if the property of k along the diversity dimension of interest is already within p, where p is a set of properties encountered so far, including the property of E. Otherwise, v(k,p)=1. Again, $f_d$ is the decay factor for adjusting the effect of indirect connections. Using connectivity and diversity measures in heuristic rules, the data analysis and processing step may also classify entities in a given network into categories outlining the criticality of entities in the network.

View generation 120 involves generating views corresponding to different depictions of the interaction data after the analysis and processing of step 110. Since these views are related and provide different aspects of the same data, appropriate interactive mechanisms are also provided to move from one view to another. In the embodiment of FIG. 1, there are six different types of views provided. Each and every one of these views is for exemplary purposes only, and it should be apparent to one of ordinary skill in the art that modifications may be made to these exemplary views without departing from the scope or spirit of the present invention.

Figure 2:
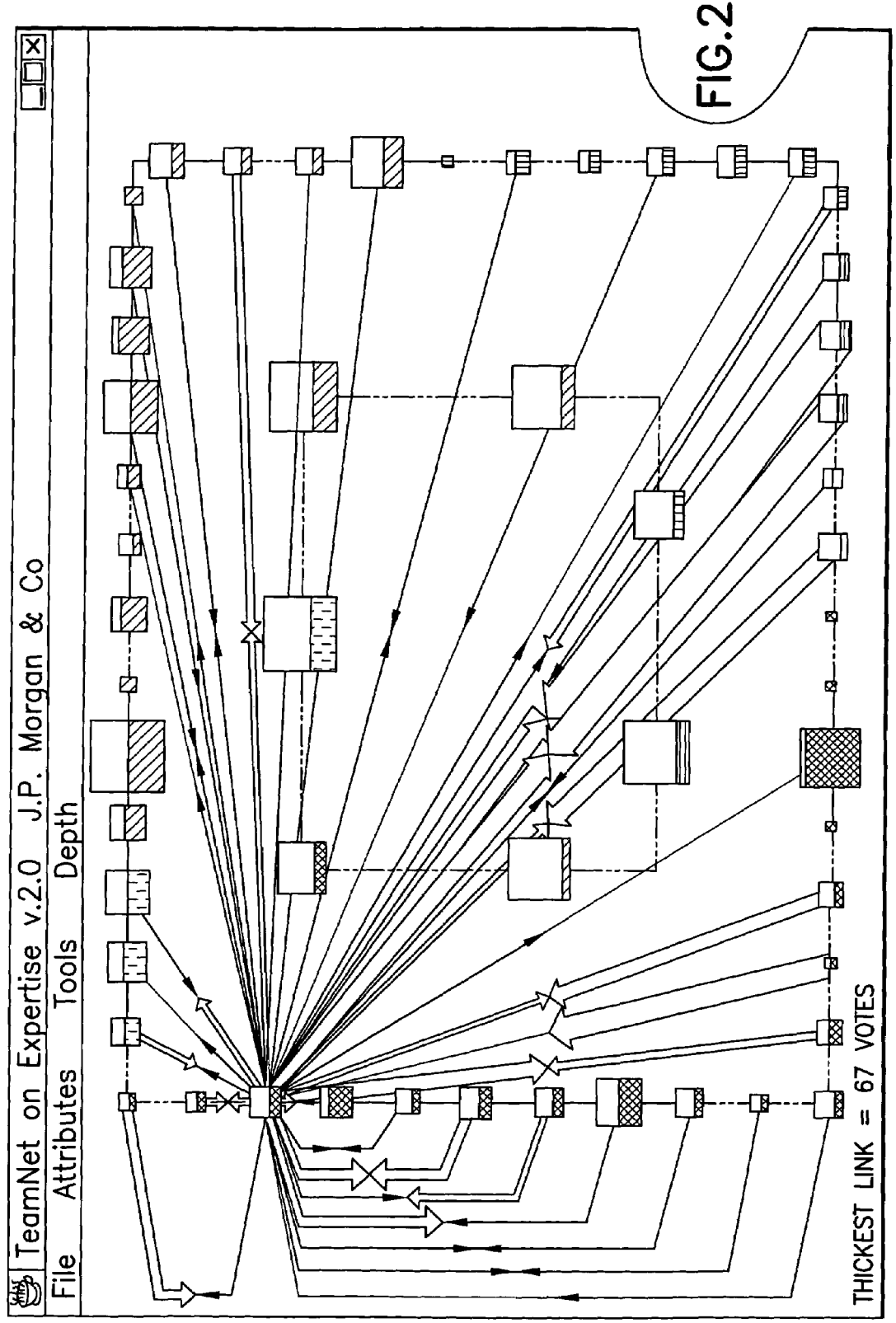
FIG. 2 shows an organization view under view generation of the interactive visual analysis methodology of FIG. 1.

First, an organization view arranges selected organizational units hierarchically, where units are represented in terms of graphical objects encoding certain data attributes using objects' graphical properties. An exemplary organization view is shown in FIG. 2, where color and location of each square box encode the relative position of the corresponding unit within an organizational hierarchy. While boxes on the innermost rectangle (layer) correspond to higher-level (parent) units, boxes on the outer layers correspond to lower-level (sub) units. Color of boxes simply encode the 'part of' relationships between units at different layers. While the size of a box represents a scalar value such as the degree of internal and external interactions of members of the corresponding unit, the gray area within each box shows the portion of internal interactions.

Figure 3:
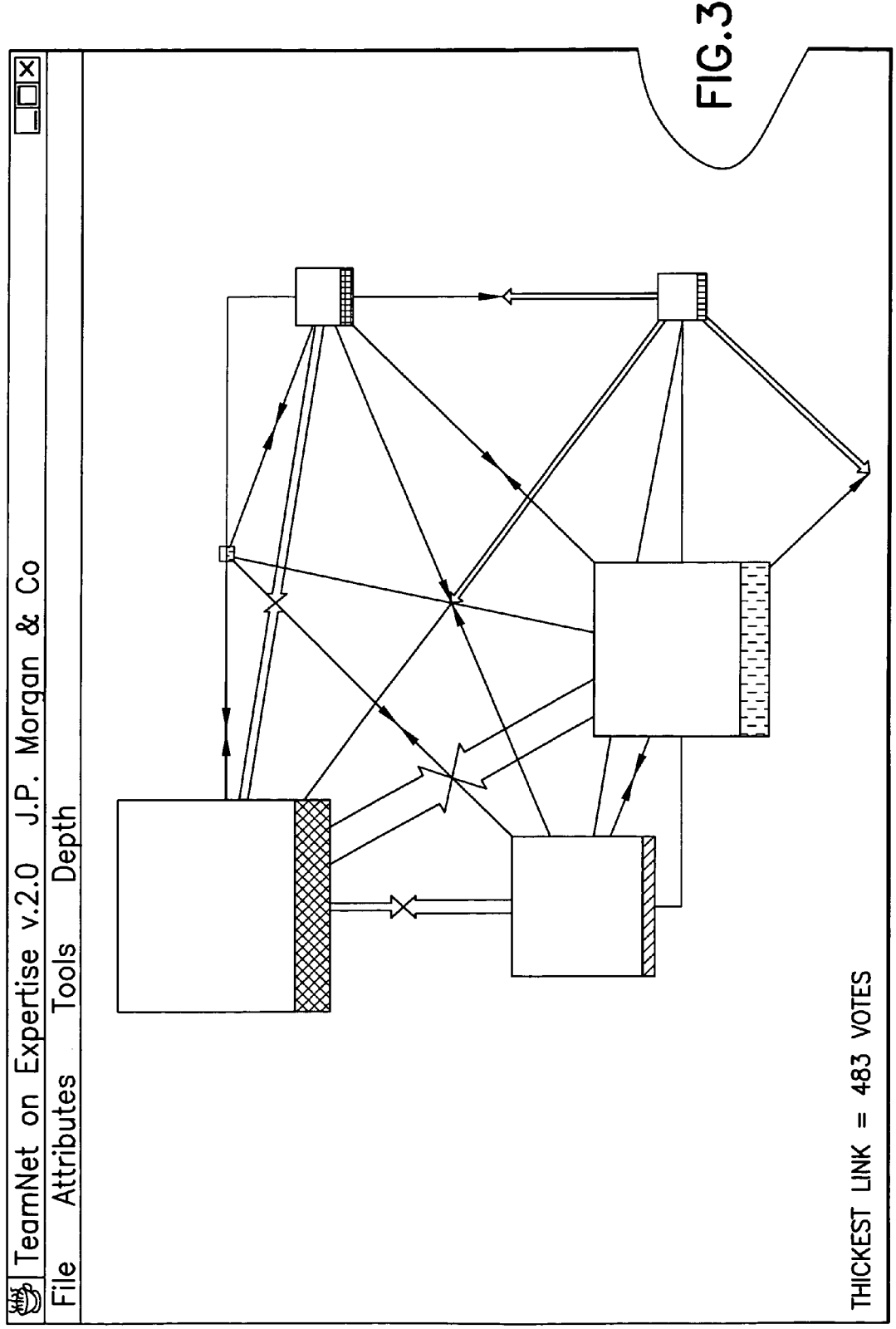
FIG. 3 shows another organization view under view generation of the interactive visual analysis methodology of FIG. 1.

In an organization view as shown in FIG. 2, any box can be selected to see how the corresponding unit interacts with other units, which is conveyed in terms of directed links having varying thickness. The direction and thickness of a link encode the direction and strength of interactions between two groups connected by the link. Besides one-to-many interactions between a selected unit and the rest, many-to-many interactions among selected units can also be displayed within an organization view as shown in FIG. 3.

Figure 4:
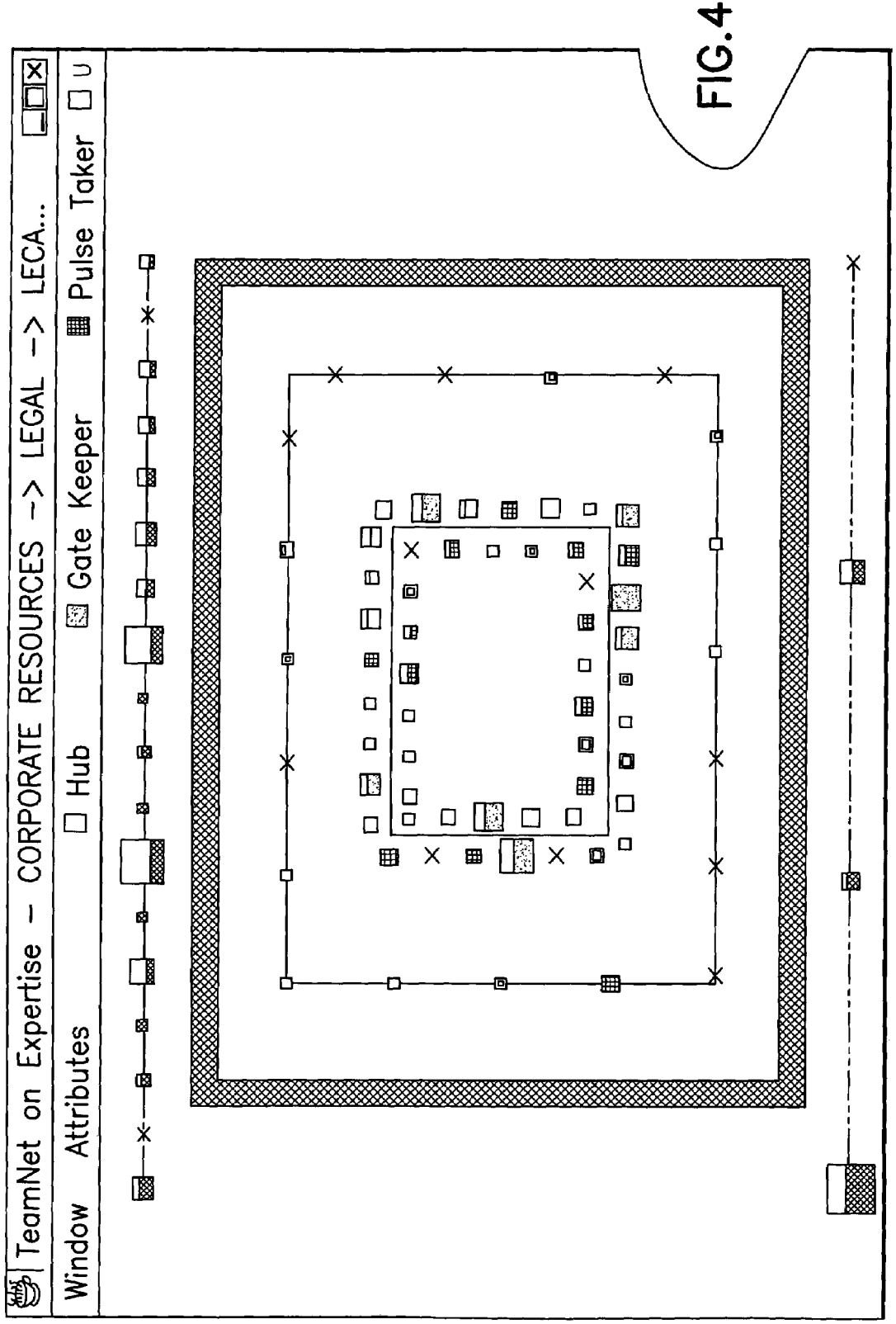
FIG. 4 shows a group view under view generation of the interactive visual analysis methodology of FIG. 1.

A second type of view provided in the example of FIG. 1 is a group view. Group view displays individual members of selected units along with their relevant attributes within a context, as illustrated in FIG. 4. In a group view, individuals are enclosed within a large bounding box having the same color as the selected unit in the organization view. In order to provide a context for the selected unit, all units that are at the same level as the parent of the selected unit are shown on a line at the top of the view. All units having the same parent as the selected unit are also shown on a line at the bottom of the view. The leftmost boxes on the top and bottom lines correspond to the parent and the selected units, respectively. As in an organization view, entities in a group view are represented in terms of graphical objects, such as boxes that are arranged hierarchically. While the size of a box represents a scalar value, such as the degree of internal and external interactions of the corresponding individual, the color may be used to encode additional attributes, such as gender, location or criticality classification.

A third type of view provided in the example of FIG. 1 is an individual view. Individual view represents an interaction record (print) of a selected individual. By definition, an individual's interaction print consists of directed interaction of that individual with others. "Directed interaction", as used herein, implies that the interaction is initiated by an individual who is the source and has a target as another individual who is the sink. Generally, an interaction print is a recursive structure representing direct and indirect interactions of an individual. In an individual view, each square represents an individual. While the largest square corresponds to the individual whose interaction print is on display, the squares to the right and to the left having the same vertical positioning (i.e., on the same horizontal line as the largest square) represent individuals who are sources and sinks, respectively.

Figure 5:
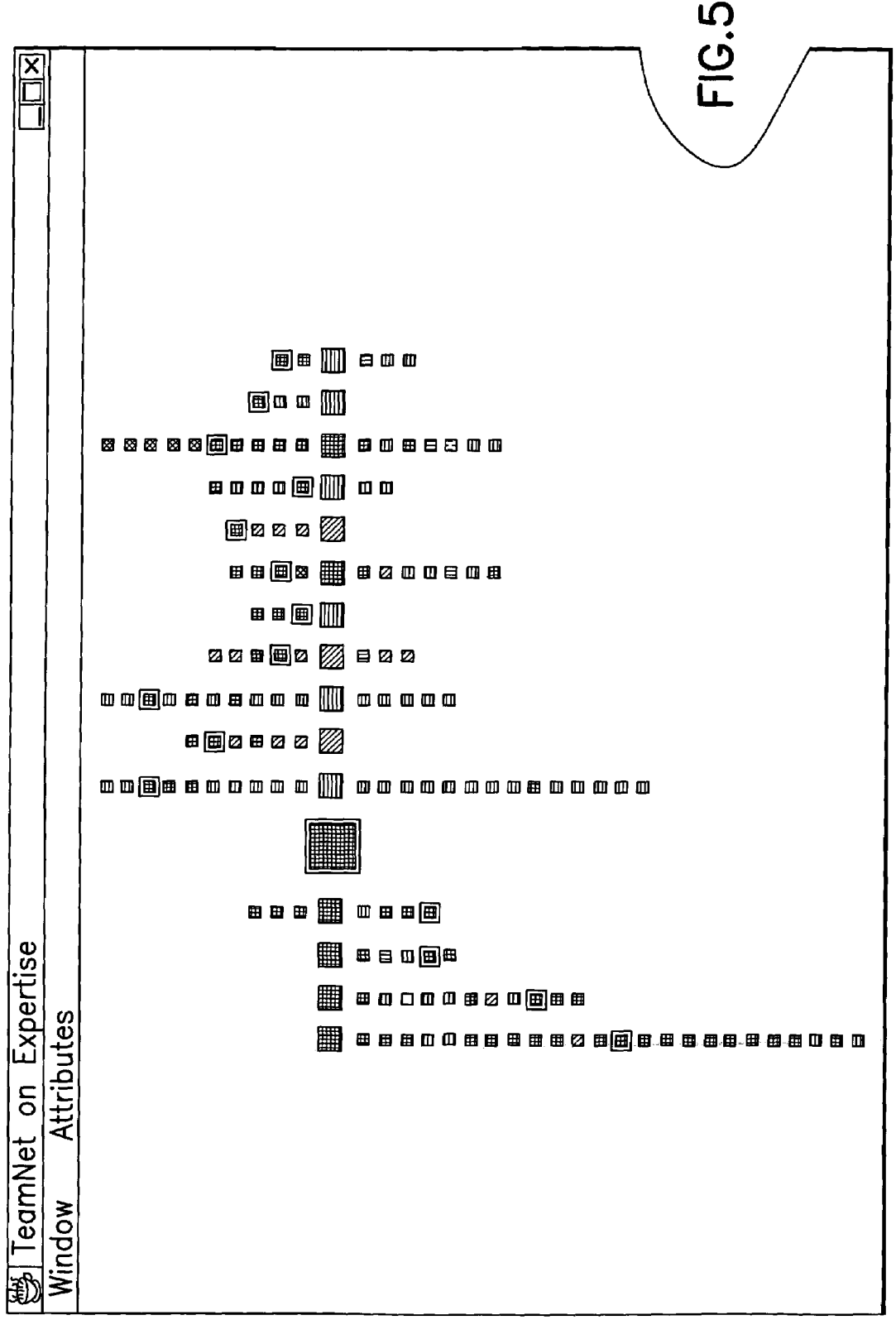
FIG. 5 shows an individual view under view generation of the interactive visual analysis methodology of FIG. 1.
Figure 6B:
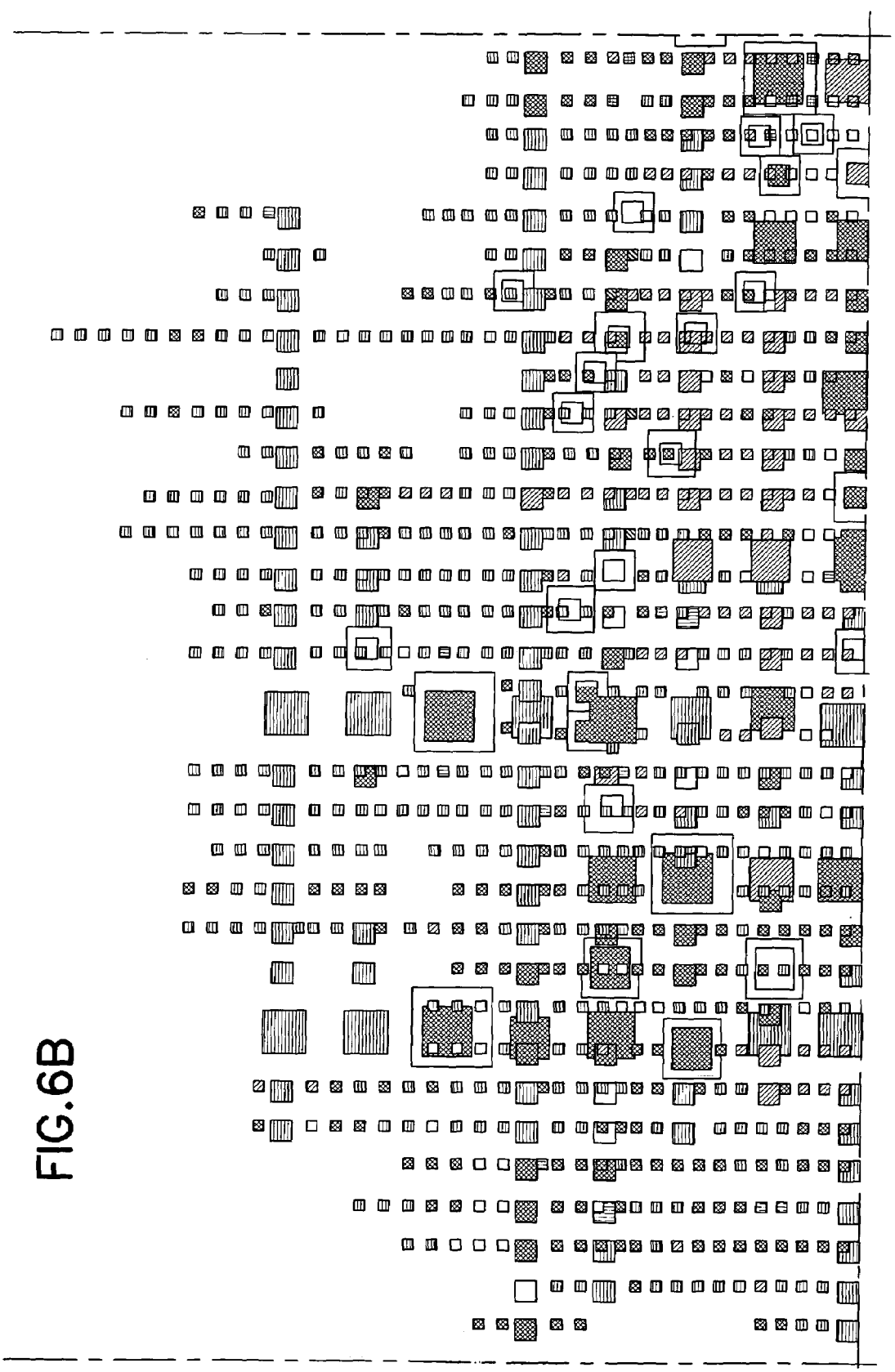
FIG. 6 shows the individual view of FIG. 5 at a higher depth value.
Figure 6C:
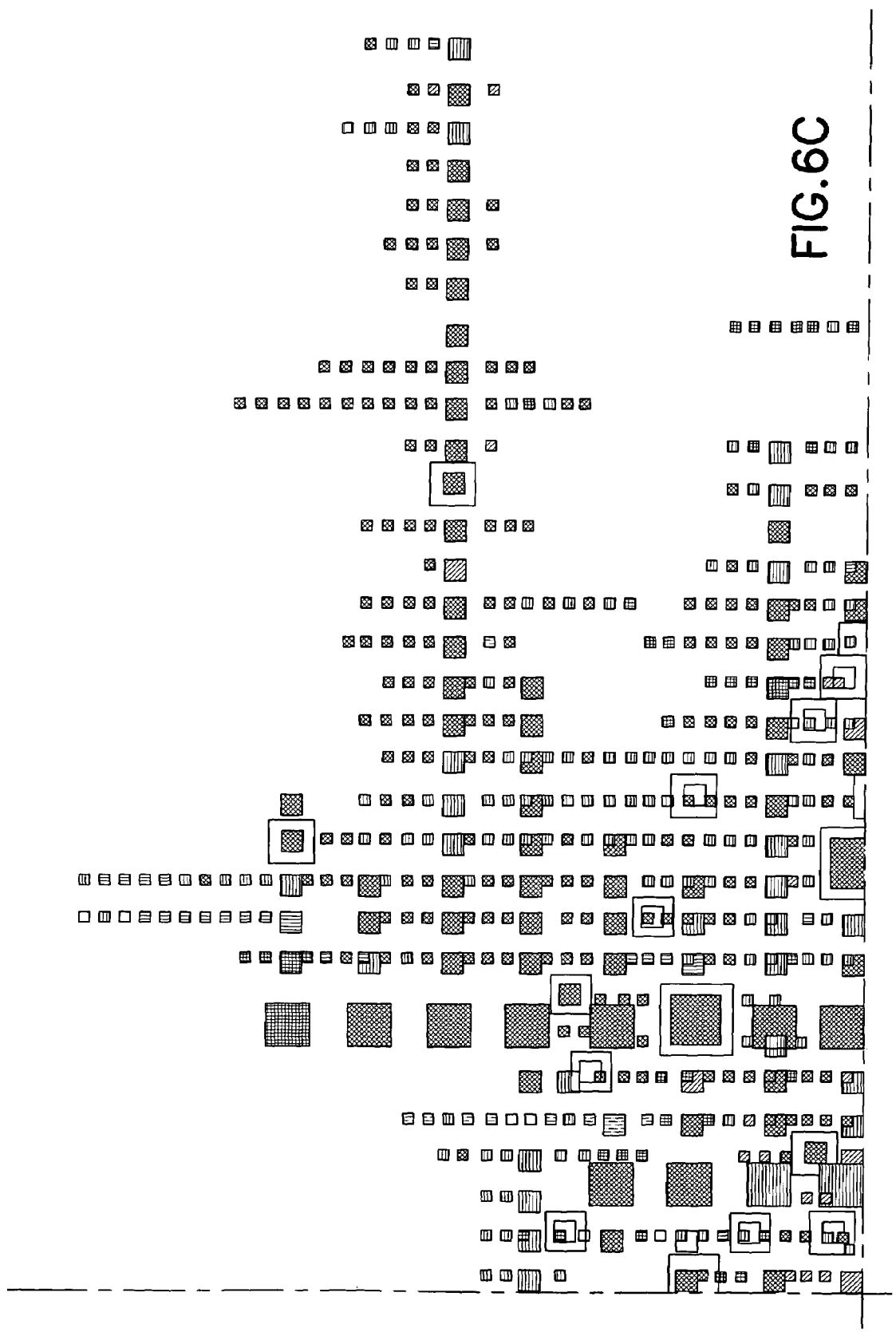
Figure 6D:
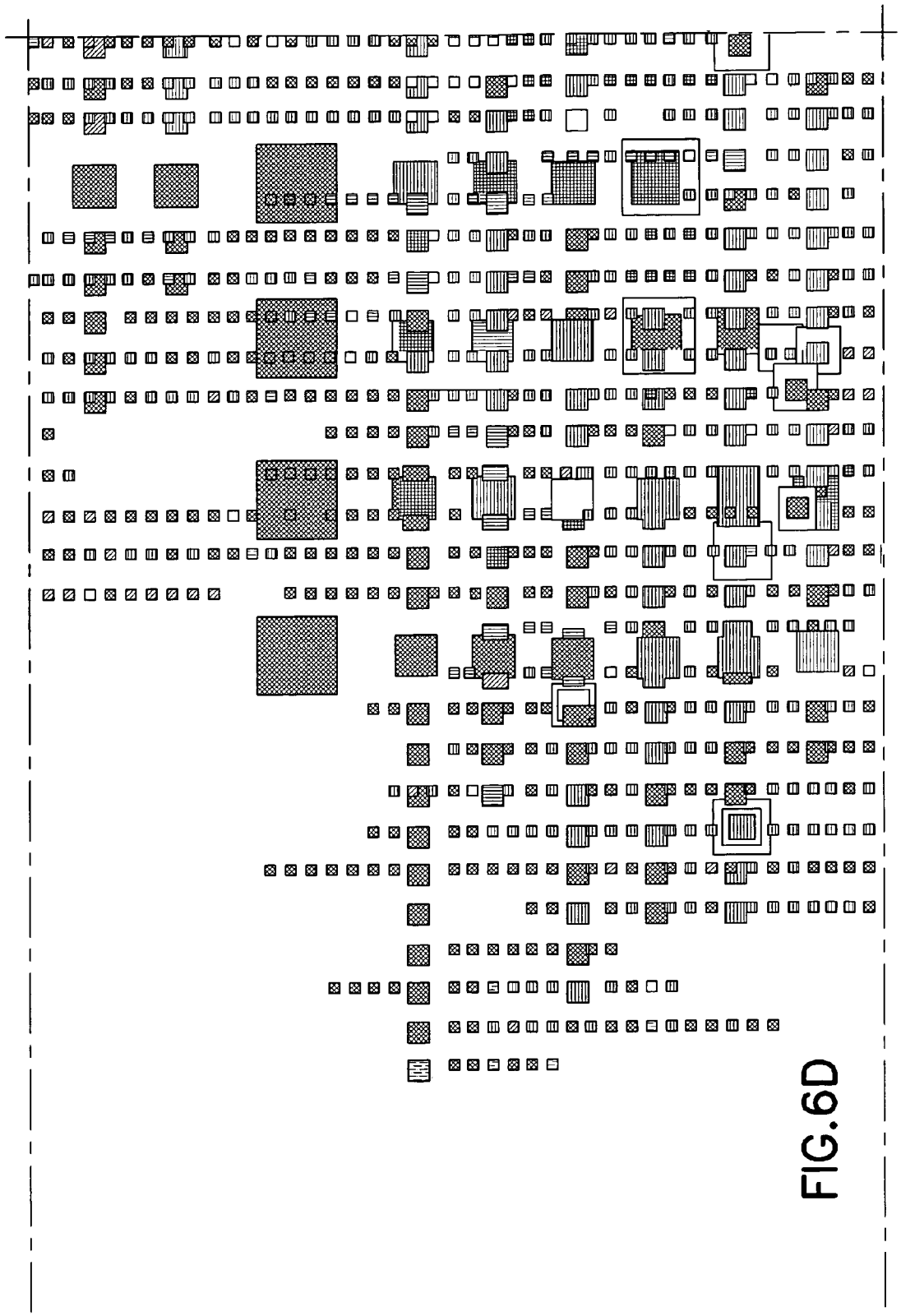
Figure 6E:
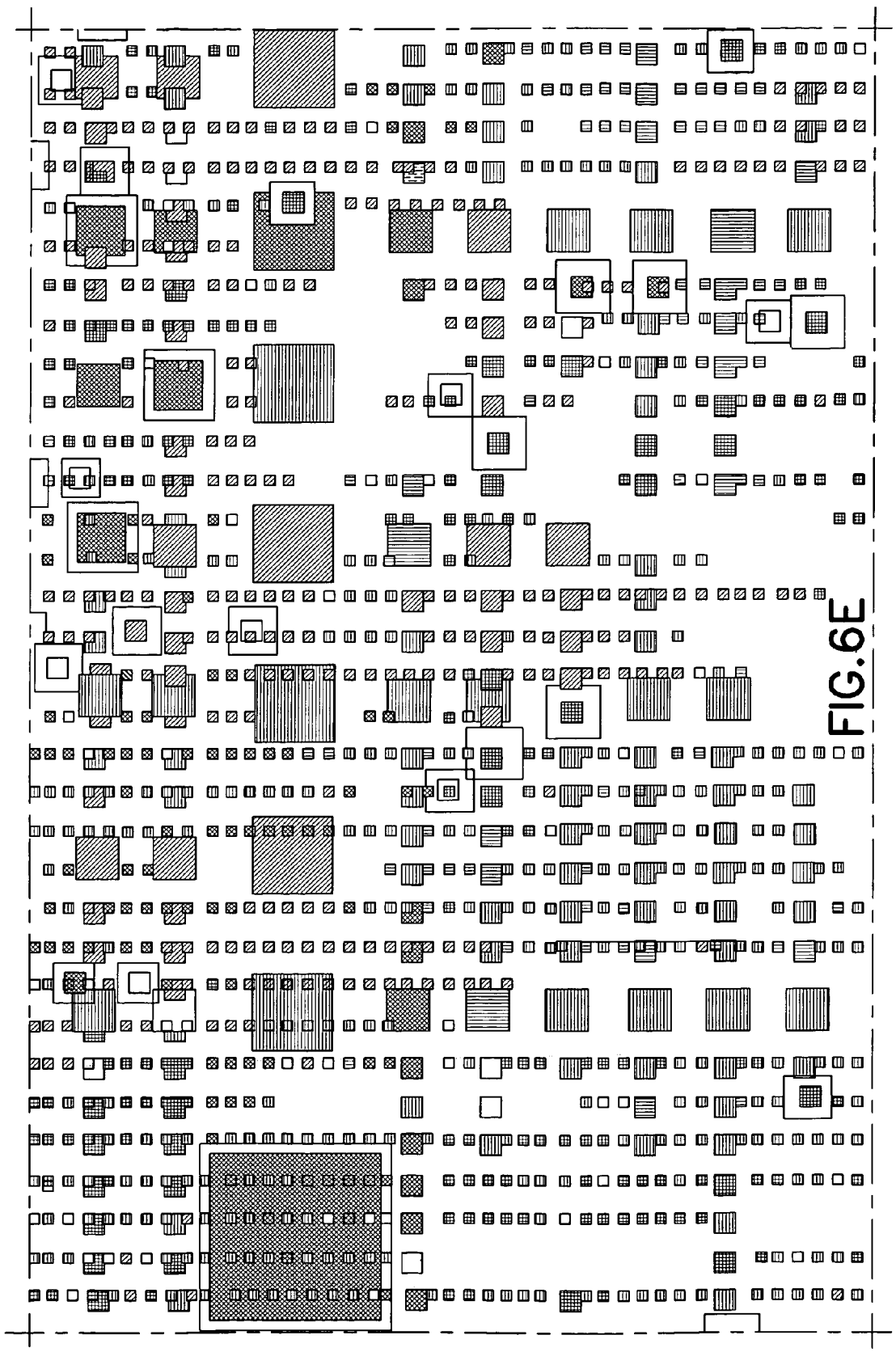
Figure 6F:
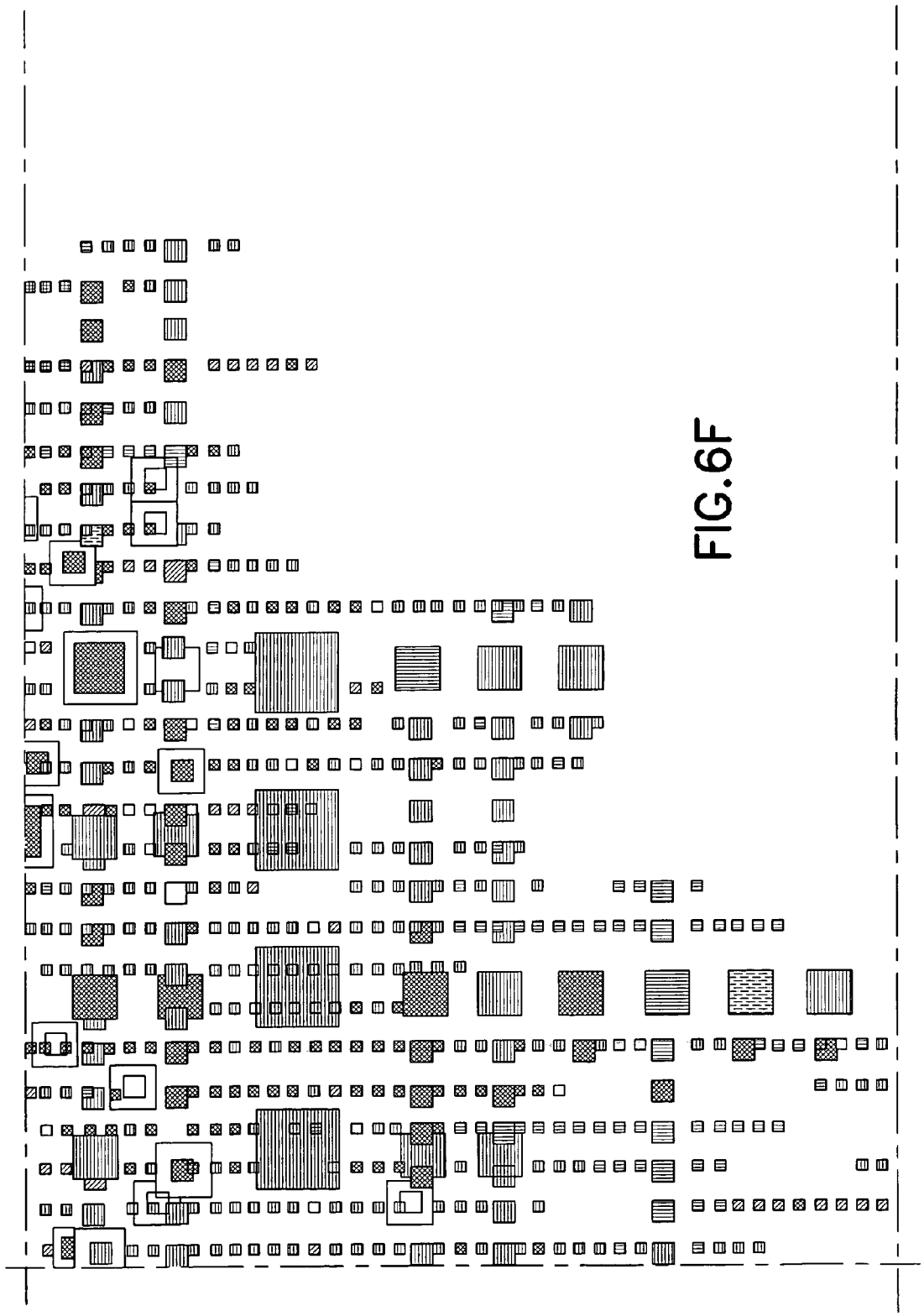
Figure 6G:
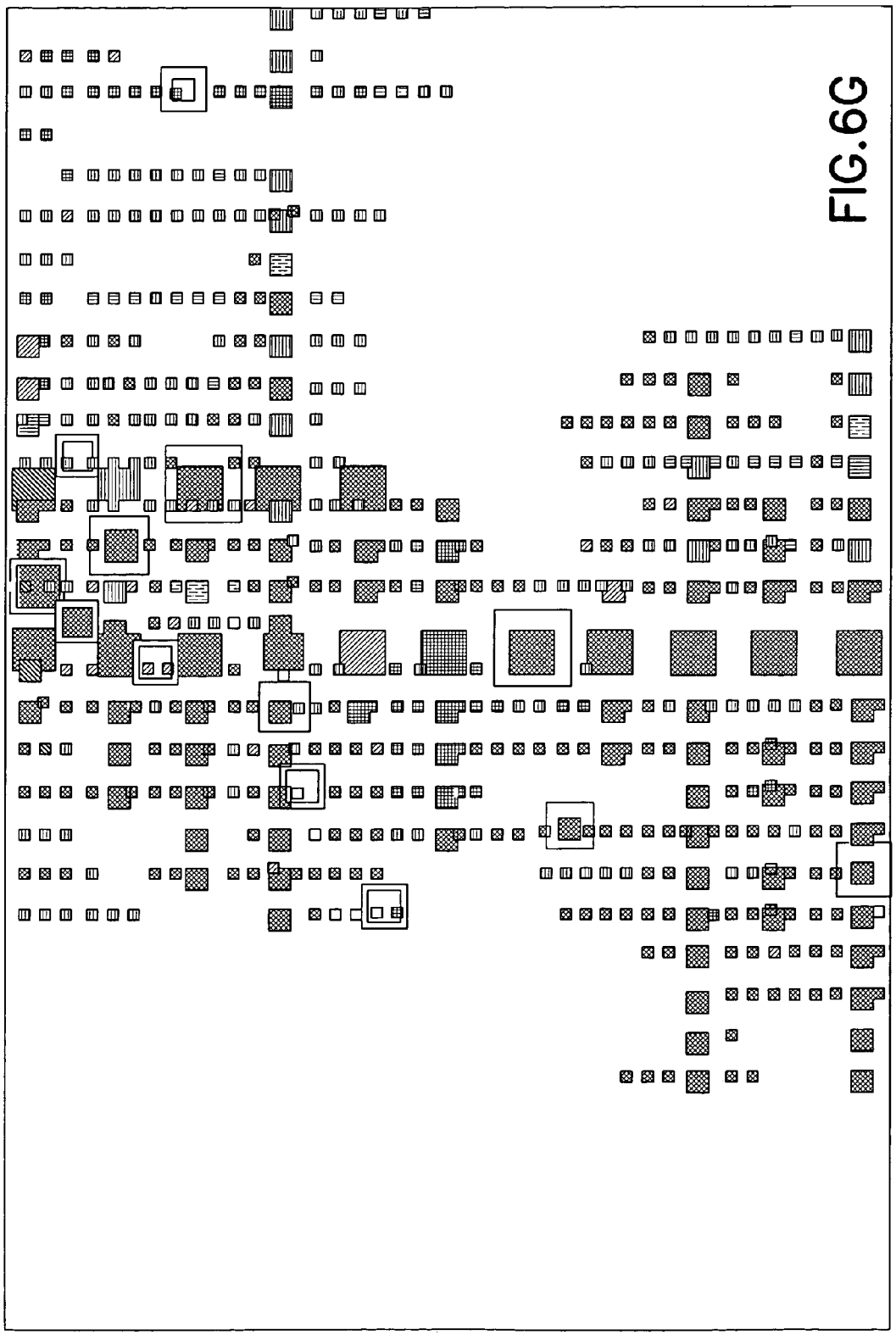
Figure 6H:
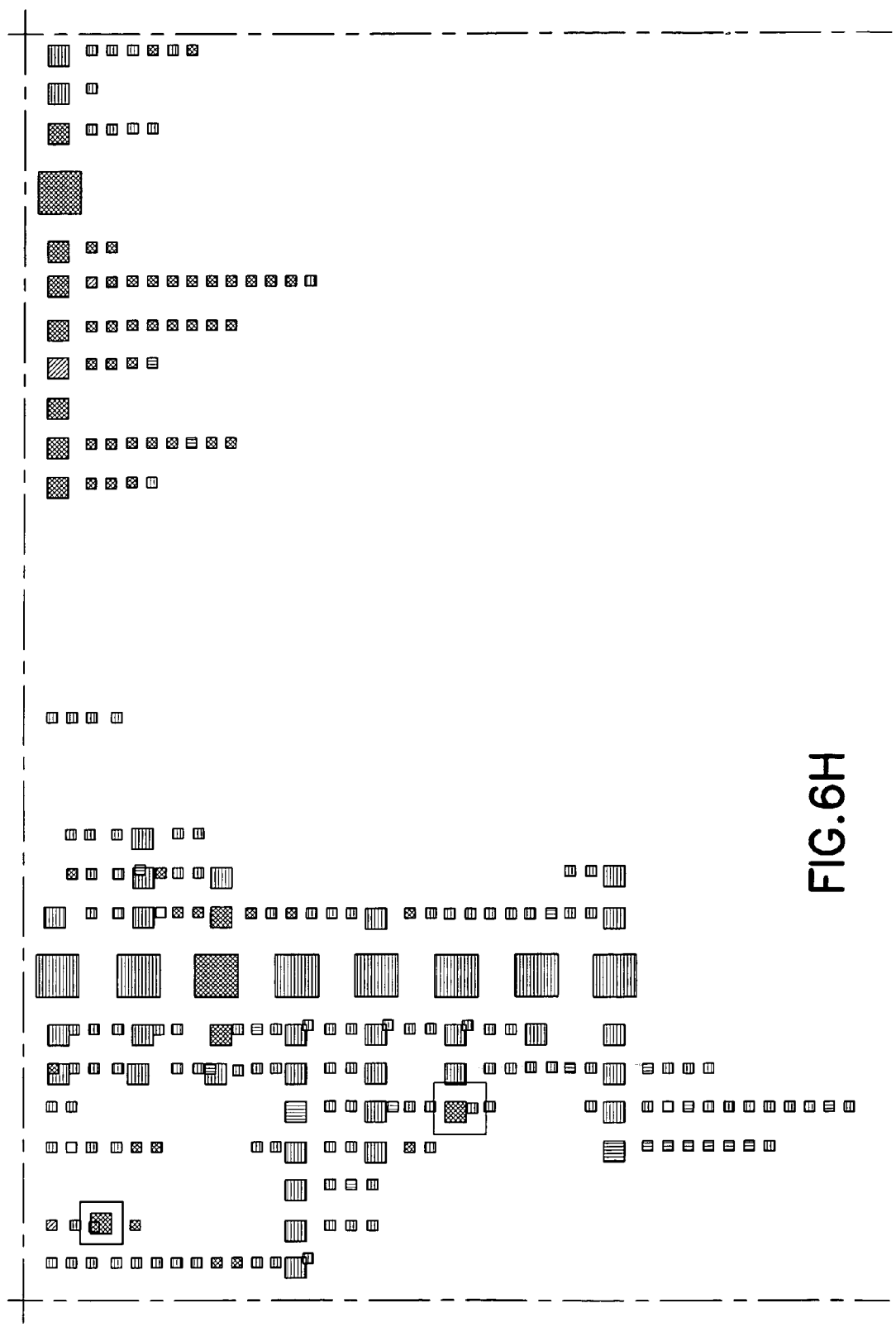
Figure 61:
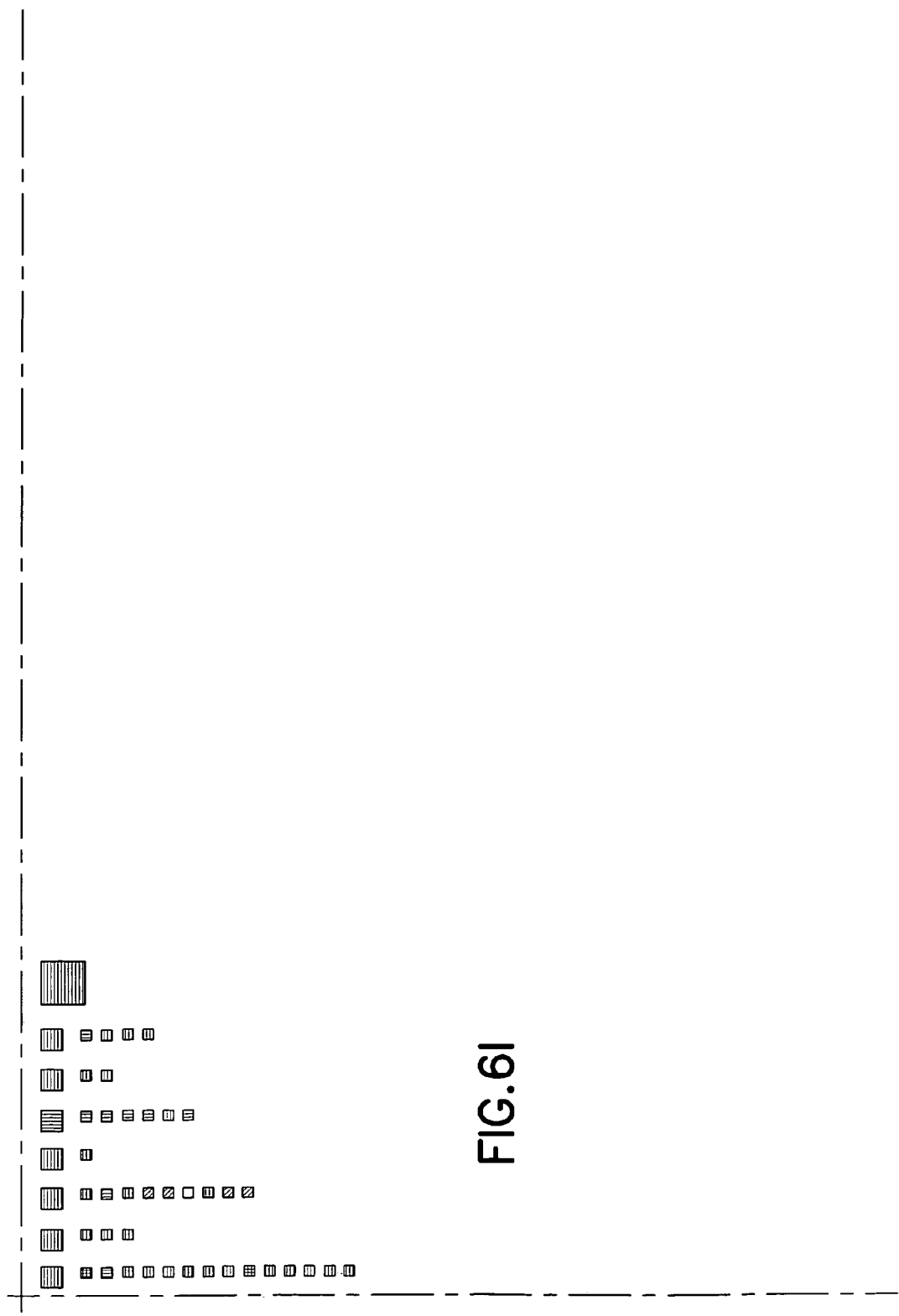

Then, for each individual who is either a source or a sink, a separate interaction print with one less depth level is created by listing the individuals who interact with that individual as sink above and as source below the individual's box having the same horizontal positioning (i.e., on the same vertical line). Repeating the process N times essentially creates an interaction print having a depth value which equals to N. In FIGS. 5 and 6, two interaction prints, one with depth=2 and the other with depth=4, are shown, respectively.

The use of boxes to represent entities has no underlying significance, other than simplicity. It should be apparent to one skilled in the art that the use of any other object to represent an entity is within the scope of this invention. Likewise, while the relative position and size of a box with respect to other boxes are used to encode important relationships among corresponding entities, the absolute position and size of boxes have no underlying significance. Although it is not utilized in the current example, the ordering of boxes on any arbitrary side of a box to represent an ordinal attribute of entities is within the scope of this invention. In individual views, color of each box may encode a particular nominal attribute of an entity. For example, color as used in FIGS. 5 and 6 may represent departmental affiliation of entities within an organization.

Figure 7:
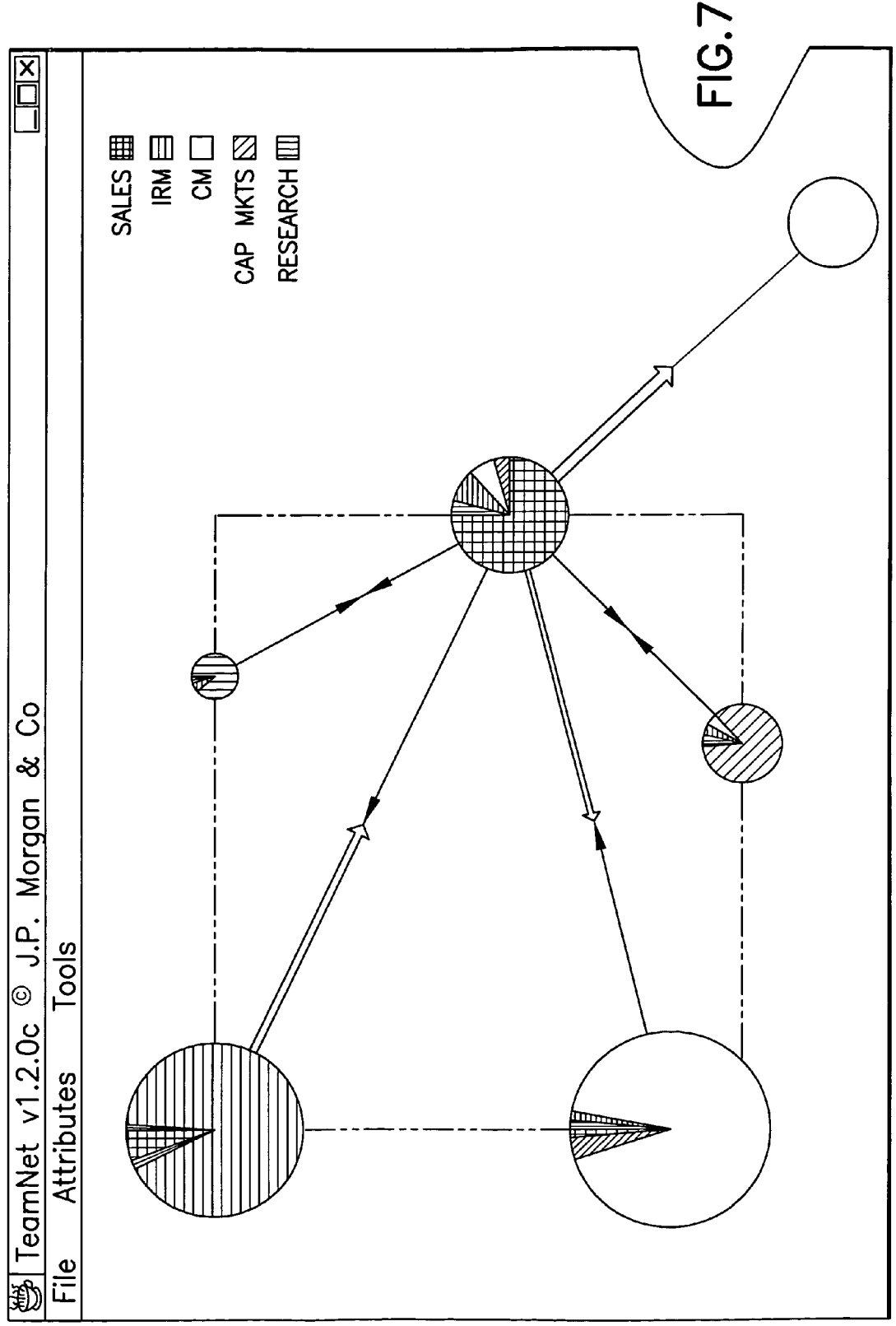
FIG. 7 shows a cluster view under view generation of the interactive visual analysis methodology of FIG. 1.

A fourth type of view provided in the example of FIG. 1 is a cluster view. Cluster view defines hypothetical groups within an organization based on existing networks. These hypothetical groups or clusters may be formed either by applying appropriate clustering techniques to the interaction data or moving people from one group to another in the current organization manually. In a cluster view, the composition of clusters are shown in terms of pie charts as illustrated in FIG. 7. It should be apparent to one of ordinary skill in the art that the use of pie charts is for exemplary purposes only and is not limited thereto. In a way similar to the display of interactions among units in an organization view, interactions between clusters are conveyed by directed links having varying thickness. While the size (radius) of pie charts encode the size of corresponding clusters, colors are used to show the current affiliation of people that make up each cluster.

Figure 8B:
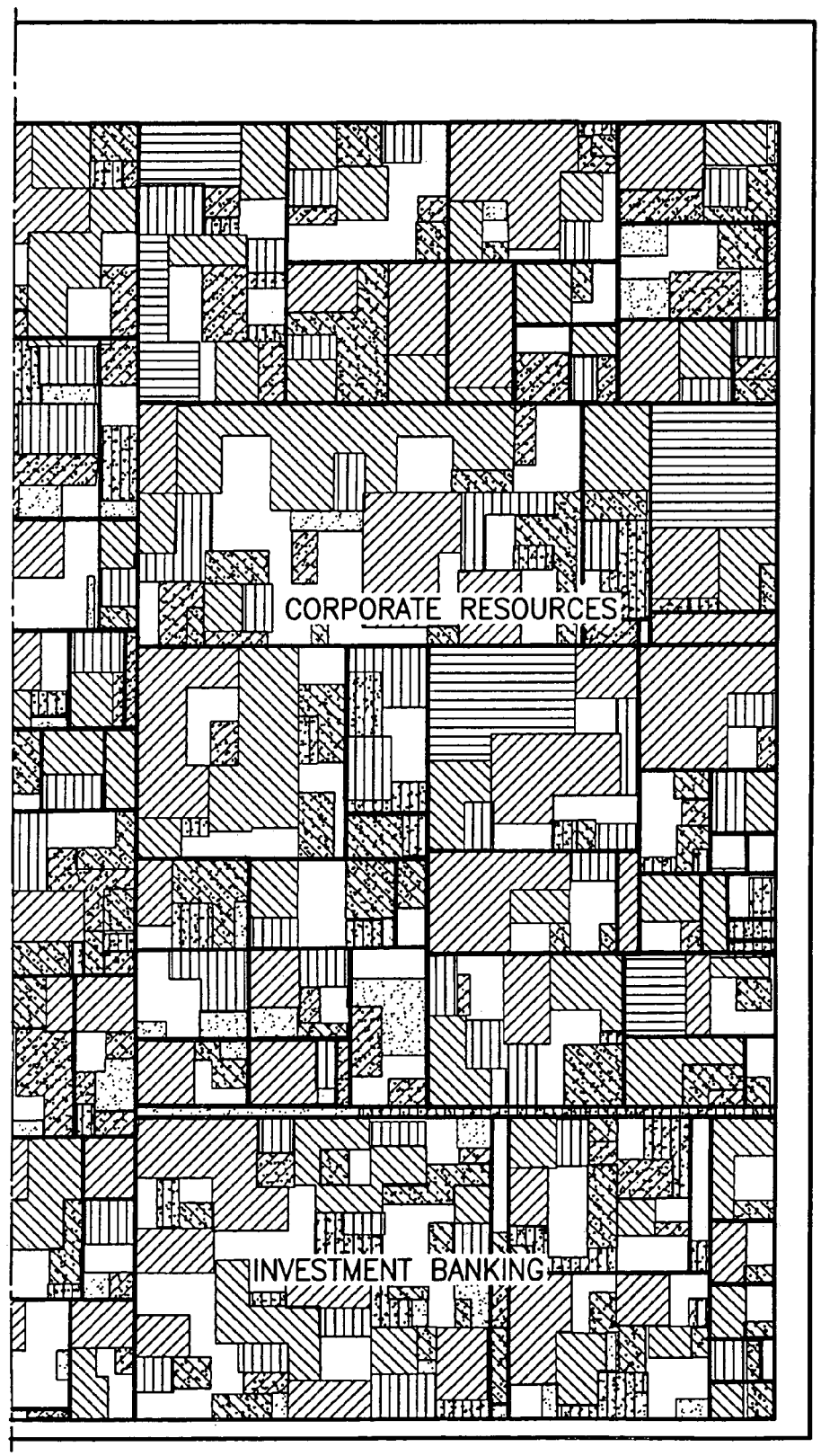
FIG. 8 shows a people map under view generation of the interactive visual analysis methodology of FIG. 1.

A fifth type of view provided in the example of FIG. 1 is a people map. A people map provides a hierarchical graph that organizes people into organizational or functional units. In a people map, as shown in FIG. 8, each person who is selected to be in the map is represented by a rectangle whose size is proportional to the connectivity of the person and whose color is determined by the diversity of the person. Since all people in a unit fill the rectangular space allocated for the unit, the connectivity of the unit is also proportional to the size of the space it fills. The dominant color in the space allocated to the unit indicates the diversity of unit's interaction or connections. For example, the AMS/PBI block in the lower left corner of the people map in FIG. 8 has lower diversity than those of other comparable units, which have a higher level of diversity.

A sixth type of view provided in the example of FIG. 1 is a topical view. Topical views may include all other views that have been described so far, where views may focus on different interaction topics ranging from general to specific. That is, each of the view types discussed so far displays a particular topical view involving a topic or an area of interaction among entities. While some of the general topics may include execution, expertise, ideas, teamwork and advice, specific topics may include domain specific issues, such as hedge fund networks in finance, magnetic resonance imaging networks in medicine or skiing networks in recreational activities. Classifying e-mail or shared resources based on content gives way to numerous topical interactions.

In a preferred embodiment of the views described above, when a graphical object, such as a box or a circle, is pointed to or otherwise indicated or selected by an input device, such as mouse, keyboard, voice recognition system, etc., a brief summary of interactions of the corresponding entity is displayed dynamically within a pop-up information window or the like. In addition, selecting a graphical object by an input device causes a detailed view or additional information about the entity associated with the object to be provided. It should be apparent to one of ordinary skill in the art that when a graphical object is pointed to or otherwise indicated or selected, the information of the corresponding entity may be presented in many different ways without departing from the scope or spirit of the present invention.

Interaction analysis 130 as shown in FIG. 1 involves generation of one or more of the views in an appropriate order as dictated by analysis tasks at hand. Some of the analysis tasks that may be supported by the process include: interaction management at organization, group and individual levels; integration of organizations, groups and individuals over time; client relationship analysis and management; critical resource identification; cluster analysis; and diversity analysis. In the embodiment of the invention described herein, not all interaction analysis tasks require the use of all views. While some of the analysis tasks can only be performed by information analysts who are experts in organization and people management, others can be performed as part of a discovery process by people who are members of the target audience.

An additional step that may be included to the methodology of the present invention in FIG. 1 is report and advice generation 140. Report and advice generation 140 involves presenting analysis results at an appropriate level of abstraction to the target audience. While domain knowledge is required to tailor reports or advice, this process lends itself in automating basic reports and advice.

The present invention has various useful applications. First, it may be used to understand roles and traits of entities, such as people or groups, within an organization where entities interact with each other dynamically and possess attributes. Second, it may be used to integrate other entities into an existing organization in an efficient and effective manner, and help them develop and grow with the changing organization over time. Third, it may be used for client relationship management and analysis. Fourth, it may be used to restructure an existing organization to improve its productivity and profitability. And fifth, it may be used for identification of critical human resources. While these are only a few specific applications of the present invention, the underlying methodology, in general, may be used as an effective vehicle for organizational knowledge and/or intellectual capital management.

The hardware/software needed to implement the present invention generally includes the following components: (1) a networked computing infrastructure, (2) server side computing resources, and (3) client side computing resources.

Since the invention involves collecting interaction data from such diverse sources as surveys, e-mail logs, phone records and shared resource access logs, a networked computing infrastructure capable of supporting data collection by polling individuals or monitoring their interactions within a distributed environment is desired. Given that such computing infrastructures are commonly available in many organizations, most of the software needed to collect data can be developed by using existing languages, utilities and/or tools in a platform-dependent manner with proper access to relevant databases.

The server side computing resources include the following preferred components: (1) database(s) capable of storing all interaction, auxiliary and derived data; (2) a web server capable of authenticating information access requests, retrieving appropriate subsets of data from the database and sending the resulting data in an appropriate format to the client side requesting the information; and (3) a proprietary code base implementing parts of the data extraction, view generation, interaction analysis and report/advice generation steps on the server side.

The client side computing resources include the following preferred components: (1) a set of generic technologies, such as cookies and Java-enabled browsers; and (2) a proprietary code base implementing parts of the view generation, interaction analysis and report/advice generation steps on the client side.

Those skilled in the art will recognize that the methods of the present invention have other applications, and that the present invention is not limited to the representative examples disclosed herein. Moreover, the scope of the present invention covers conventionally known variations and modifications to the methods described herein, as would be known by those skilled in the art.

What is claimed is:

1. A method for graphically representing interactions of three or more entities who are members of an organization, wherein each entity is a person or a group of persons and wherein at least two entities directly interact with multiple entities within said organization and/or persons who are not members of said organization and wherein the environment of each organization member entity comprises at least one entity, which comprises:
   (a) determining a connectivity measure for each of said member entities wherein said connectivity measure comprises means for measuring the strength by which each entity is connected to its environment
   (b) determining a diversity measure for each of said member entities wherein said diversity measure comprises means for measuring the diversity of said entities in their interactions and their connections with their environment;
   (c) wherein said connectivity measure and said diversity measure each employs a recursive mathematical algorithm that employs a decay factor to account for the effects of indirect interactions among entities;
   (d) providing a graphical object corresponding to each of said member entities and each person within said entities;
   (e) generating a graphical object corresponding to each member entity and each person within said entity
   (f) varying graphical properties of said graphical objects to correspond to the connectivity measure and the diversity measure;
   (g) displaying said graphical objects and interactions on a display screen whereby the interactions between the individual member entities and persons represented by said graphical objects are displayed.

2. The method of claim 1, wherein the size of said graphical objects is varied according to the connectivity and/or diversity measure.

3. The method of claim 1, which further comprises providing for user selection of a portion of said display screen such that only those graphical objects within said user selected portion of said display screen are displayed.

4. The method of claim 1, which further comprises allowing for user selection of one of said units such that interactions between individual members of said selected unit is graphically represented.

5. The method of claim 1 which further comprises displaying on said display screen direct interactions between the individual persons and indirect interactions between the individual persons to a preselected depth level.

6. The method of claim 5, wherein said preselected depth level may be user selected.

7. A computerized method for interactive visual analysis of interactions among entities, where entities are individuals or groups, comprising:
   (a) collecting interaction data among three or more entities, wherein each entity is an individual or a group of individuals, and wherein at least two entities directly interact with multiple entities;
   b) computer processing said collected interaction data with connectivity and diversity measures;
      (i) wherein connectivity is a measure for assessing how well said entities are connected to their environments using a decay factor to account for the effects of indirect interactions among entities; and
      (ii) diversity is a measure for assessing how diverse said entities are in their interactions with or connections to their environments using a decay factor to account for the effects of indirect interactions among entities; and
   c) wherein an environment of each entity comprises at least one entity; and
   d) displaying said processed interaction data and appropriate raw interaction data for interaction analyses.

8. The method of claim 7, wherein said connectivity measure is a recursive mathematical algorithm that employs a decay factor to account for the effects of indirect interactions among entities and wherein the algorithm preferably has the formula:

$$C(E, L) = \Sigma_{1 \leq k \leq N} [w(k) + C(k, L-1)/f_d] C(E, 0) = 0$$

where C(E, L) denotes connectivity of entity E at depth L where E has N direct interactions, w(k) is the weight of direct interactions from k, and $f_d$ is the decay factor.

9. The method of claim 7, wherein said diversity measure is a recursive mathematical algorithm that employs a decay factor to account for the effects of indirect interactions among entities and wherein the algorithm preferably has the formula:

$$D(E, L) = \Sigma_{1 \leq k \leq N} [v(k, p) + D(k, L-1)/f_d] D(E, 0) = 0$$

where, D(E, L) denotes diversity of entity E at depth L where E has N direct interactions, and v(k, p)=0 if the property of k along the diversity dimension of interest is already within p, where p is a set of properties encountered so far, including the property of E or otherwise, v(k, p)=1.

10. The method of claim 7, wherein said collecting interaction data includes of one or more of the following: network surveys, monitoring of e-mail traffic, monitoring of telephone traffic, monitoring of access to shared resources.

11. The method of claim 7, wherein said displaying processed interaction data comprises generating an organization view where interactions among entities of an organization are represented graphically.

12. The method of claim 7, wherein displaying said processed interaction data comprises generating at least one of the following views:
   (i) a group view where entities of a predefined group and their pre-specified attributes are represented graphically;
   (ii) an individual view where interactions relating to a specific entity are represented graphically;
   (ii) a cluster view where interactions among predefined units of entities are represented graphically;
   (iii) a people map where said connectivity and diversity measures for predefined units of entities are represented graphically;
   (iv) a topical view where the view generated is dependent upon a predetermined interaction topic.

13. The method of claim 7, which further comprises generating a report based on results of the interaction analysis.

14. A system for interactive visual analysis of interactions among three or more entities who are members of an organization, wherein each entity is a person or a group of persons and wherein at least two entities directly interact with multiple entities within said organization and/or persons who are not members of said organization, the system comprising:
   (a) a computer having a microprocessor and a storage unit;
   (b) a database electronically coupled to said computer for storing interaction data among three or more entities, auxiliary information and any additional data derived from said interaction data, wherein each entity is an individual or a group of individuals, and wherein at least two entities directly interact with multiple entities;

(c) algorithms stored in said storage unit and operable by said microprocessor for measuring connectivity and diversity of entities based on their interactions, wherein connectivity is a measure for assessing how well said entities are connected to their environments and diversity is a measure for assessing how diverse said entities are in their interactions with or connections to their environment and wherein a environment of each entity comprises at least one other entity;

(d) a set of programs for accessing interaction data and generating views dynamically;

(e) a display screen electronically coupled to said computer for providing a user interface, said user interface providing appropriate controls for displaying and interactively manipulating each generated view;

(f) a user input device electronically coupled to said computer; and (g) a user selectable element of said user interface being responsive to user input via said user input device to generate a report based on analysis results.

15. A computerized method for interactive visual analysis of interactions among three or more entities who are members of an organization, wherein each entity is a person or a group of persons and wherein at least two entities directly interact with multiple entities within said organization and/or persons who are not members of said organization, the method comprising:

(a) collecting interaction data among said entities;

(b) computer processing said collected interaction data with a connectivity measure for assessing how well said entities are connected to their environments;

(c) wherein an environment of each entity comprises at least one other entity; and (d) wherein said connectivity measure employs a decay factor to account for the effects of indirect interactions among entities and is a recursive mathematical algorithm in the form of $$C(E, L) = \Sigma_{1 \leq k \leq N}[w(k) = C(k, L-1)/f_d]C(E, 0) = 0$$

where $C(E, L)$ denotes connectivity of entity E at depth L where E has N direct interactions, $w(k)$ is the weight of direct interactions from k, and $f_d$ is the decay factor;

(e) computer processing said collected interaction data with a diversity measure for assessing how diverse said entities are in their interactions with or connections to their environments, wherein said diversity measure employs a decay factor to account for the effects of indirect interactions among entities and is a recursive mathematical algorithm in the form of $$D(E, L) = \Sigma_{1 \leq k \leq N}[v(k, p) + D(k, L-1)/f_d]D(E, 0) = 0$$

where, $D(E, L)$ denotes diversity of entity E at depth L where E has N direct interactions, and $v(k, p) = 0$ if the property of k along the diversity dimension of interest is already within p, where p is a set of properties encountered so far, including the property of E or otherwise, $v(k, p) = 1$;

(f) displaying said processed interaction data and appropriate raw interaction data for interaction analyses.

* * * * *